United States Patent
Kashiwagi

(10) Patent No.: US 10,114,596 B2
(45) Date of Patent: Oct. 30, 2018

(54) PRINTING APPARATUS CAPABLE OF PREVENTING INFORMATION LEAKAGE WHEN ERROR OCCURS, METHOD OF CONTROLLING THE SAME, AND STORAGE MEDIUM

(71) Applicant: CANON KABUSHIKI KAISHA, Tokyo (JP)

(72) Inventor: Masaki Kashiwagi, Hiratsuka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/404,795

(22) Filed: Jan. 12, 2017

(65) Prior Publication Data
US 2017/0206042 A1    Jul. 20, 2017

(30) Foreign Application Priority Data
Jan. 20, 2016 (JP) .................. 2016-008706

(51) Int. Cl.
G06K 15/00 (2006.01)
G06F 3/12 (2006.01)
H04N 1/40 (2006.01)

(52) U.S. Cl.
CPC ........... *G06F 3/1238* (2013.01); *G06F 3/121* (2013.01); *G06F 3/1204* (2013.01); *G06F 3/1217* (2013.01); *G06F 3/1222* (2013.01); *G06F 3/1263* (2013.01); *G06F 3/1274* (2013.01); *G06F 3/1285* (2013.01)

(58) Field of Classification Search
CPC ...... G06F 3/1204; G06F 3/122; G06F 3/1222; G06F 3/1234; G06F 3/1238; G06F 3/1255; G06F 3/1267; G06F 3/1274; G06F 3/1284; G06F 3/1285; G03G 15/55; G03G 15/5016; G03G 15/502; G03G 15/5087; G03G 2215/00447; G03G 2215/00109; G06K 15/1817; G06K 15/1823
USPC ...... 399/81, 82; 358/1.1, 1.11–1.18; 347/19, 347/7; 709/203; 718/102
See application file for complete search history.

(56) References Cited

U.S. PATENT DOCUMENTS

| | | | |
|---|---|---|---|
| 5,638,511 A * | 6/1997 | Nezu ............ | G06F 21/608 399/366 |
| 2003/0065404 A1 * | 4/2003 | Bhatti .......... | G06F 3/1204 700/1 |
| 2005/0052699 A1 * | 3/2005 | Goicoechea .... | G06F 3/1204 358/1.16 |
| 2010/0007909 A1 * | 1/2010 | Aikens ......... | G06F 3/1222 358/1.15 |
| 2011/0170893 A1 * | 7/2011 | Nishikawa ..... | G03G 15/55 399/81 |

FOREIGN PATENT DOCUMENTS

JP    H11134122 A    5/1999

* cited by examiner

*Primary Examiner* — Chad Dickerson
(74) *Attorney, Agent, or Firm* — Rossi, Kimms & McDowell LLP

(57) ABSTRACT

A printing apparatus capable of preventing information leakage without significantly lowering the user-friendliness when an error occurs during execution of a print job. A storage unit stores a plurality of print jobs. If an error occurs during execution of a print job, a print job out of the print jobs stored in the storage unit, to which is added predetermined information indicating to cancel the print job, is automatically canceled.

10 Claims, 6 Drawing Sheets

FIG. 3

| BASIC SETTINGS | PAGE SETTINGS | FINISH | SHEET FEEDING | PRINT QUALITY |

FAVORITE(F): STANDARD SETTING ▶
OUTPUT METHOD(M): PRINT ▶  ADD(I)...  EDIT(2)...

☑ DO NOT CANCEL JOB AT TIME OUT AFTER OCCURRENCE OF ERROR — 301

ORIGINAL SIZE(S):
A4

NUMBER OF COPIES(Q): 1 ▲▼ SET (1-9999)

OUTPUT SHEET SIZE(Z):
SAME AS ORIGINAL SIZE ▶

ORIENTATION OF PRINT(O)
◉ PORTRAIT   ○ LANDSCAPE

PAGE LAYOUT(Y):
1in1 (STANDARD) ▶

☐ SPECIFY MAGNIFICATION(N)
MAGNIFICATION(G): 100 ▲▼ % (25-200)

SINGLE-SIDED/DOUBLE-SIDED/BOOKBINDING(I):
SINGLE-SIDED PRINTING ▶

DETAILED BOOKBINDING(K)

BINDING DIRECTION(B):
LONG-SIDE BINDING (LEFT) ▶

MARGIN(U)

STAPLING/SORTING/GROUP(H):
SORTING ▶

SPECIFY STAPLING POSITION(L)

A4 (MAGNIFICATION: AUTOMATIC)

COLOR MODE(C):
AUTOMATIC (COLOR/MONOCHROME) ▶

CONFIRM SETTINGS(V)
RETURN TO STANDARD(R)

OK   CANCEL   HELP

PRINTING APPARATUS CAPABLE OF PREVENTING INFORMATION LEAKAGE WHEN ERROR OCCURS, METHOD OF CONTROLLING THE SAME, AND STORAGE MEDIUM

BACKGROUND OF THE INVENTION

Field of the Invention

The present invention relates to control performed when an error occurs during execution of a print job.

Description of the Related Art

Conventionally, there has been known a printing apparatus that controls execution of a print job. Examples of the print job include a PDL (Page Description Language) job which is input from a client computer to the printing apparatus e.g. via a network. Further, in the printing apparatus, an error sometimes occurs during execution of a print job. For example, if an error having occurred during execution of a print job is a paper out error, generally, execution of the print job is interrupted, and is not restarted unless sheets are replenished by the user. To cope with this, there has been proposed a technique that, in a case where a paper out error occurs, preferentially executes a subsequent job while interrupting the preceding job (see e.g. Japanese Patent Laid-Open Publication No. H11-134122). This makes it possible to prevent the whole processing efficiency from lowering due to prolonged interruption of the operation of the printing apparatus.

However, when an error occurs, if a subsequent job is preferentially executed, another problem is caused by the preceding print job which has been interrupted and left for a long time period. For example, assuming that A-4 size sheets run out during execution of a print job for printing images on A-4 size sheets, if a long time period elapses without A-4 size sheets being replenished, printed matter already printed by the interrupted print job can be left for the long time period. Therefore, in a case where classified information is included in contents to be printed, it is undesirable from the viewpoint of security that the print job is left for a long time period.

To solve this problem, in a case where an error occurs during execution of a print job, there can be envisaged a method of automatically cancelling execution of the print job. Further, it is also envisaged to cancel not only the print job having caused the error, but also another print job in queue at the time to thereby further reduce the security risk. This is because it is difficult for the owner of the other print job in queue to predict when the error is eliminated, or when the print job having caused the error is canceled, and if the other print job is printed at an unintended timing, a printed matter is liable to be read by other persons.

However, the print job can be a print job which includes no classified information, and has no problem even if the printed matter is read by a third party. Therefore, assuming that all print jobs are automatically canceled according to occurrence of an error, such a print job including no classified information is also canceled, and have to be transmitted again from a client computer, which requires time and effort of the user. In short, there has been a problem that when an error occurs, it is difficult to prevent information leakage and also maintain the user-friendliness at the same time.

SUMMARY OF THE INVENTION

The present invention provides a printing apparatus which is capable of preventing information leakage without significantly lowering the user-friendliness when an error occurs during execution of a print job, and a method of controlling the same.

In a first aspect of the invention, there is provided a printing apparatus comprising a controller including a processor and a memory, the controller is configured to function as a storage unit configured to store a plurality of print jobs, an execution unit configured to execute one of the stored print jobs, and a control unit configured to control, in accordance with an occurrence of an error in the execution of the one print job, whether or not to cancel a print job of the stored print jobs which is different from the one print job, wherein whether or not to cancel the different print job is controlled based on predetermined information relating to cancellation added to the different print job.

In a second aspect of the invention, there is provided a method of controlling a printing apparatus including a storage unit, comprising storing a plurality of print jobs in the storage unit, executing one of the stored print jobs, and controlling, in accordance with an occurrence of an error in the execution of the one print job, whether or not to cancel a print job of the stored print jobs which is different from the one print job, wherein whether or not to cancel the different print job is controlled based on predetermined information relating to cancellation added to the different print job.

In a third aspect of the invention, there is provided a non-transitory computer-readable storage medium storing a computer-executable program for executing a method of controlling a printing apparatus including a storage unit, wherein the method comprises storing a plurality of print jobs in the storage unit, executing one of the stored print jobs; and controlling, in accordance with an occurrence of an error in the execution of the one print job, whether or not to cancel a print job of the stored print jobs which is different from the one print job, wherein whether or not to cancel the different print job is controlled based on predetermined information relating to cancellation added to the different print job.

According to the present invention, it is possible to prevent information leakage without significantly lowering the user-friendliness when an error occurs during execution of a print job.

Further features of the present invention will become apparent from the following description of exemplary embodiments (with reference to the attached drawings).

BRIEF DESCRIPTION OF THE DRAWINGS

FIG. 3 is a diagram of a print job-setting screen displayed when a print job is input.

DESCRIPTION OF THE EMBODIMENTS

The present invention will now be described in detail below with reference to the accompanying drawings showing embodiments thereof. It should be noted that the present invention is not limited to the embodiments described below, and not all combinations of features described in the embodiments are absolutely essential to solution according to the invention.

Figure 1:
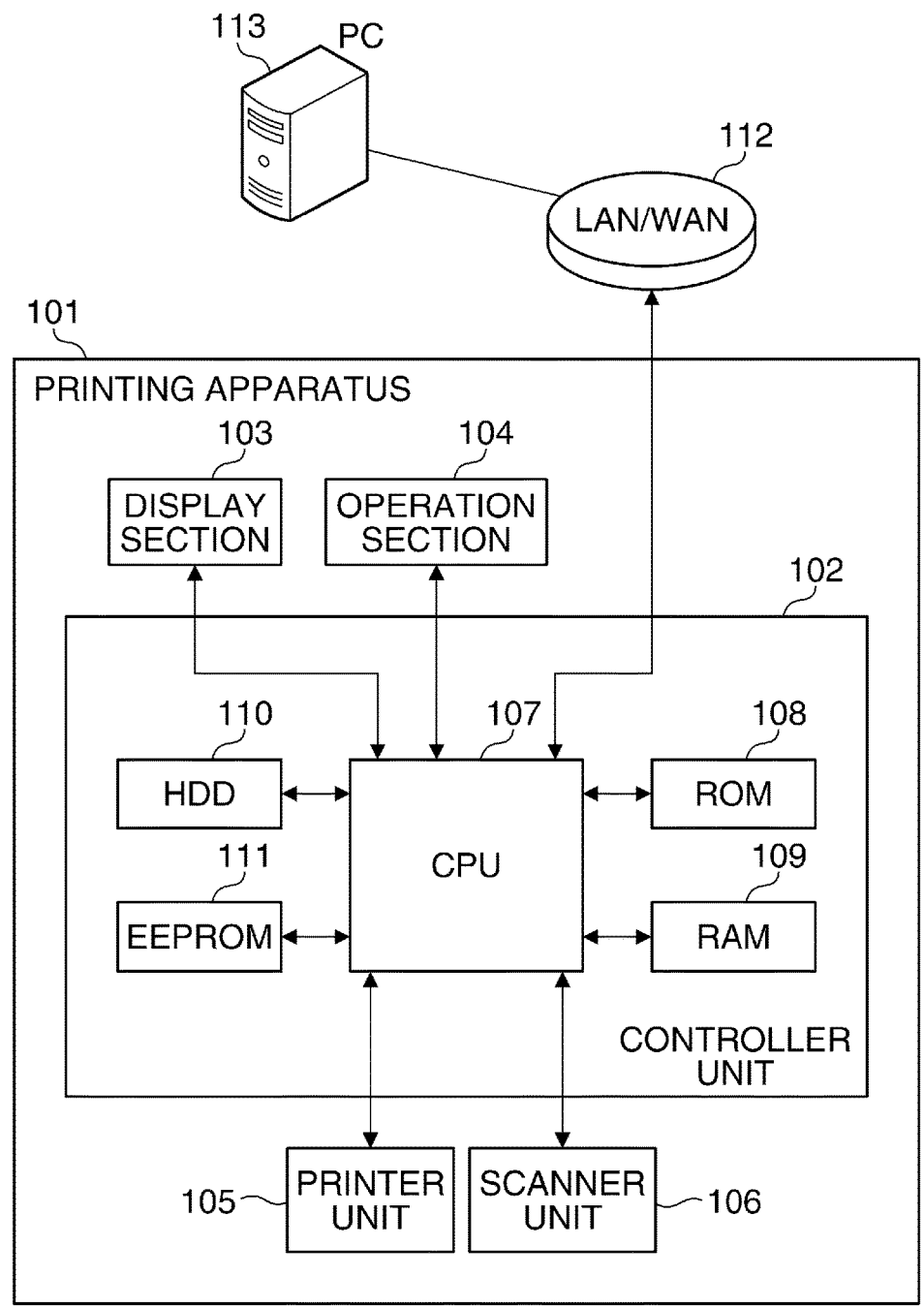
FIG. 1 is a block diagram of a printing system including a printing apparatus.

FIG. 1 is a block diagram of a printing system including a printing apparatus according to an embodiment of the present invention. This printing system is formed by communicably connecting a PC 113 as an external apparatus to the printing apparatus, denoted by reference numeral 101, via a LAN/WAN 112. The printing apparatus 101 includes a controller unit 102, a display section 103, an operation section 104, a printer unit 105, and a scanner unit 106. The display section 103 includes an LED or a liquid crystal display, and displays the contents of a user's operation and the internal state of the apparatus. The operation section 104 receives a user's operation via a hard key group or a touch panel function of the display section 103.

The printer unit 105 receives a print instruction from the controller unit 102, and prints an image on a sheet based on image data sent from the controller unit 102. Note that the printer unit 105 includes a fixing section (not shown) for fixing an image (toner image) transferred onto the sheet. The printer unit 105 is capable of printing images on sheets of a plurality of sizes including the A4 size and the A3 size. Note that examples of the sheets include plain paper, thick paper, and a recording medium, such as a transparent film. The scanner unit 106 receives a scan instruction from the controller unit 102, reads an image on an original, and sends obtained image data to the controller unit 102. Further, the printer unit 105 is also capable of performing print processing based on image data generated by the scanner unit 106.

The controller unit 102 is comprised of a CPU 107, a ROM 108, a RAM 109, an HDD 110, and an EEPROM 111. The CPU 107 executes control programs stored in the printing apparatus 101, and controls operations of devices connected to the controller unit 102 via each interface and a memory of a storage medium. The ROM 108 is a read-only memory, and stores a boot program necessary for starting the system. The RAM 109 is a volatile memory, and is used as a work memory when executing the control programs.

The HDD 110 is a storage medium, such as a magnetic disk, and stores the control programs, image data, and so forth. The EEPROM 111 is a nonvolatile memory, and stores set values necessary for execution of the control programs, and so forth. The EEPROM 111 stores information (sheet size and sheet type) associated with each sheet holding section and so forth. The CPU 107 is capable of receiving PDL data from the PC 113 via the LAN/WAN 112, and causing the printer unit 105 to perform print processing based on the received PDL data (PDL job). The PDL data is generated by a printer driver installed in the PC 113 which is a host computer. The number of external apparatuses connected to the LAN/WAN 112 is not limited, and further, is not limited by the configuration of the PC 113.

The printing apparatus 101 is configured such that one CPU 107 performs processes of flowcharts, described hereinafter, using one memory (RAM 109), but this is not limitative. For example, the printing apparatus 101 can be configured to perform the processes by causing a plurality of CPUs and a plurality of RAMS, or the HDD and an SSD to cooperate with each other. Further, part of the processes, described hereinafter, may be performed using a hardware circuit, such as an ASIC (Application Specific Integrated Circuit).

Figure 2:
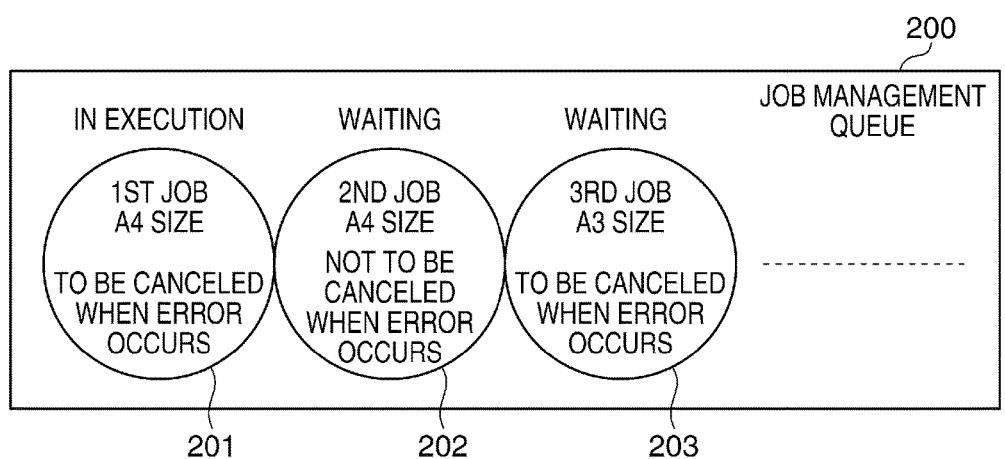
FIG. 2 is a conceptual diagram of a job management queue.

FIG. 2 is a conceptual diagram of a job management queue used by the printing apparatus 101 so as to manage print jobs. A print job including image data, print settings, etc., is stored in the HDD 110 or the RAM 109, and is managed as the job management queue, denoted by reference numeral 200. The HDD 110 and the RAM 109 are capable of storing a plurality of print jobs, and while one print job is being executed, other (subsequent) print jobs remain in queue without being executed. In the job management queue 200, the print jobs are managed by being arranged in the order of inputting thereof (order in which the printing apparatus 101 received the print jobs).

In the example illustrated in FIG. 2, a first job 201 is being executed at present, and a second job 202 and a third job 203 are to be executed following the first job 201. When execution of the first job 201 is finished, execution of the second job 202 is started, and when execution of the second job 202 is finished, execution of the third job 203 is started. If an error occurs during execution of any print job, execution of the print job having caused the error is interrupted, and execution of the print job is not restarted until the error is eliminated, and hence the subsequent print jobs in the job management queue 200 continue to be in queue.

To each of the print jobs, predetermined information which can be set by a user who is the owner of the print job has been added on the client computer (PC 113) side which is a sender of the print job. More specifically, the predetermined information includes information on whether or not a print job input by the owner is to be subjected to job cancellation processing performed by the printing apparatus 101 when a predetermined time period elapses after occurrence of an error. In the illustrated example in FIG. 2, the predetermined information indicating to cancel the print job is added to the first job 201 and the third job 203. On the other hand, the predetermined information indicating not to cancel the print job is added to the second job 202. Job cancellation processing performed when an error occurs is executed based on the predetermined information added to each of the print jobs. Therefore, the first job 201 and the third job 203 can be canceled. As a consequence, confidentiality is positively ensured. On the other hand, the second job 202 is prevented from being canceled. This saves the user time and effort to input the second job 202 again.

FIG. 3 is a diagram of a print job-setting screen displayed on a display provided on the PC 113 when a print job is input. This print job-setting screen is displayed when a print job is generated by the printer driver in the PC 113.

The user of the PC 113 (owner of the print job) is enabled to check a check box 301. By checking the check box 301, the predetermined information indicating not to subject the print job to job cancellation processing is added to the generated print job. On the other hand, if the print job-setting screen is terminated without checking the check box 301, the predetermined information indicating to subject that the print job to job cancellation processing is added to the generated print job.

Figure 4:
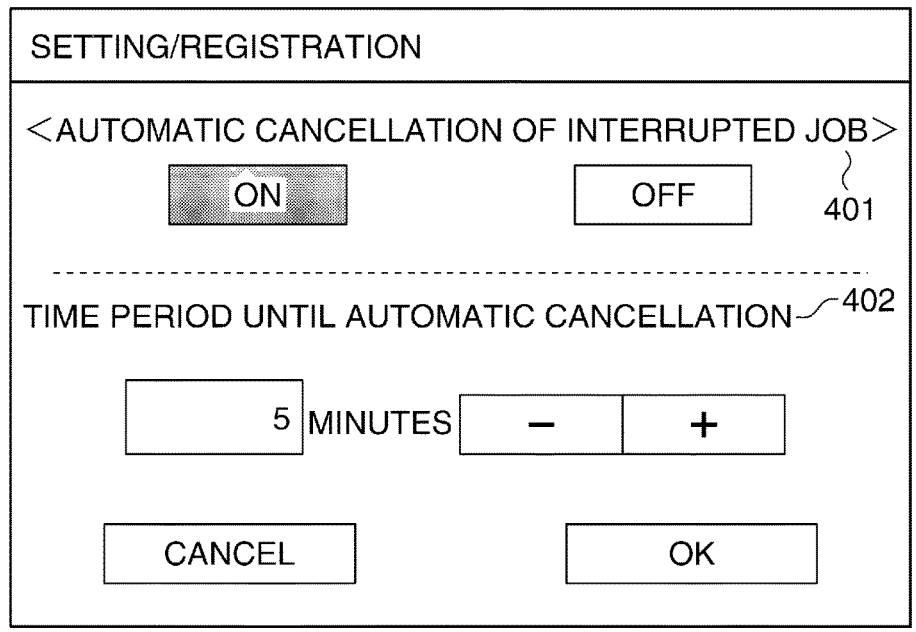
FIG. 4 is a diagram of a cancellation setting screen concerning automatic cancellation.

FIG. 4 is a diagram of a cancellation setting screen which is displayed on the display section 103 of the printing apparatus 101 when making settings concerning automatic cancellation function. Automatic cancellation of a print job will be described with reference to FIG. 4. As mentioned above, if an error occurs during execution of a print job, execution of the print job having caused the error is interrupted, and execution of the print job is not restarted until the error is eliminated. In this case, if a long time period elapses without eliminating the error, the print job is left in the interrupted state. This state is not preferable from the viewpoint of security particularly when classified information is included in the contents to be printed based on the print job.

In view of this, the printing apparatus 101 is equipped with the automatic cancellation function for automatically canceling a print job. More specifically, the automatic cancellation function is a function in which if an error occurs during execution of a print job and a predetermined time period elapses in a state in which execution of the print job is interrupted, the interrupted print job is automatically canceled. Note that in the present example, importance is placed on security, and hence when the interrupted print job is canceled, other (subsequent) print jobs registered in the job management queue 200 at the time are also canceled. However, as described hereinafter, out of the other print jobs registered in the job management queue 200, print jobs to which the predetermined information indicating not to cancel the print job is added are not canceled.

The user can select ON (enabled) or OFF (disabled) of the automatic cancellation function using a setting item 401 included in the cancellation setting screen shown in FIG. 4. Further, in a case where the automatic cancellation function is enabled, a predetermined time period T1 can be set using a setting item 402. The setting of ON/OFF of the automatic cancellation function and the setting of the predetermined time period T1 are applied to all (unprocessed) print jobs registered in the job management queue 200. Note that the screen shown in FIG. 4 can be operated only by an administrator of the printing apparatus 101, and hence an operator is required to be authenticated as the administrator to cause the printing apparatus 101 to display the screen shown in FIG. 4. Note that the automatic cancellation function may be set to ON by default, and in this case, the predetermined time period T1 may be also set to a fixed value by default.

Figure 5:
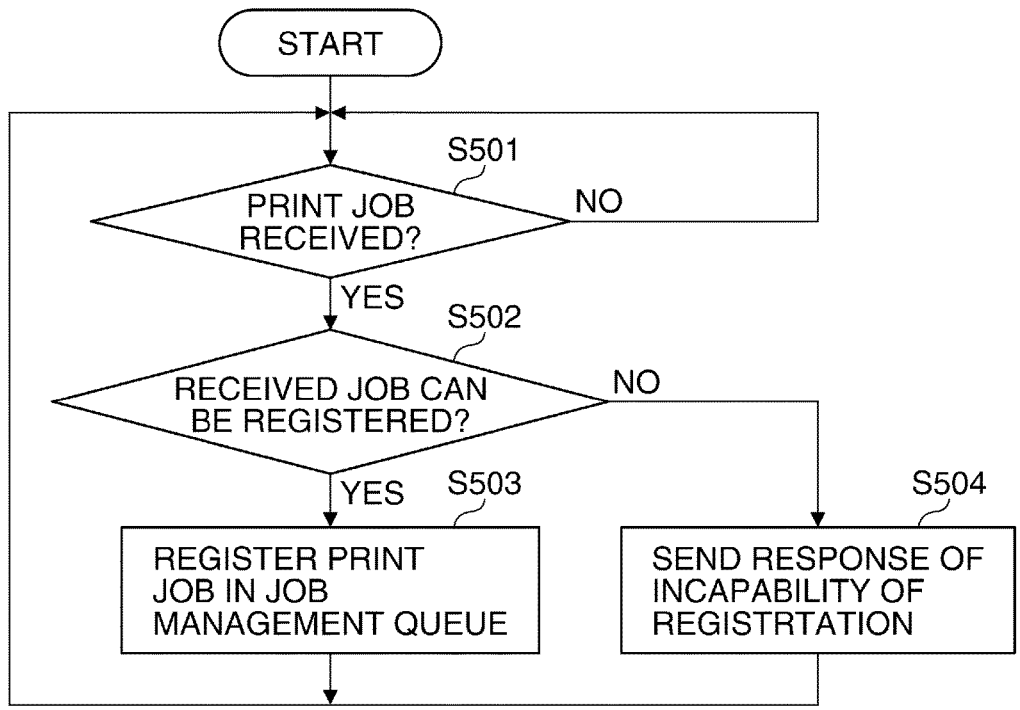
FIG. 5 is a flowchart of a print job-receiving process.

FIG. 5 is a flowchart of a print job-receiving process performed by the printing apparatus 101. The processing operations (steps) performed in the process in FIG. 5 are realized by the CPU 107 of the printing apparatus 101 executing a control program stored in the ROM 108. This process is started when the printing apparatus 101 is powered on.

First, in a step S501, the CPU 107 determines whether or not a print job has been received. The CPU 107 repeats this determination until a print job is received, and if a print job is received, the CPU 107 determines whether or not the received print job can be registered (step S502). This determination is performed based e.g. on whether or not the number of print jobs is larger than an upper limit of the number of print jobs that can be registered. More specifically, first, the CPU 107 compares a total number of print jobs registered in the job management queue 200 and the print job received this time, with the upper limit of the number of jobs that can be registered in the job management queue 200. Then, if the total number is not larger than the upper limit of the number of jobs, the CPU 107 determines that the print job received this time can be registered, whereas if the total number exceeds the upper limit of the number of jobs, the CPU 107 determines that the print job received this time cannot be registered.

If it is determined in the step S502 that the received print job can be registered, the CPU 107 registers the print job received in the step S501 in the job management queue 200 (step S503), and proceeds to the step S501 to wait for receipt of a next print job. If it is determined in the step S502 that the print job cannot be registered, the CPU 107 sends information indicating that the print job received in the step S501 cannot be registered to the sender of the print job (step S504), and waits for receipt of a next print job.

Figure 6A:
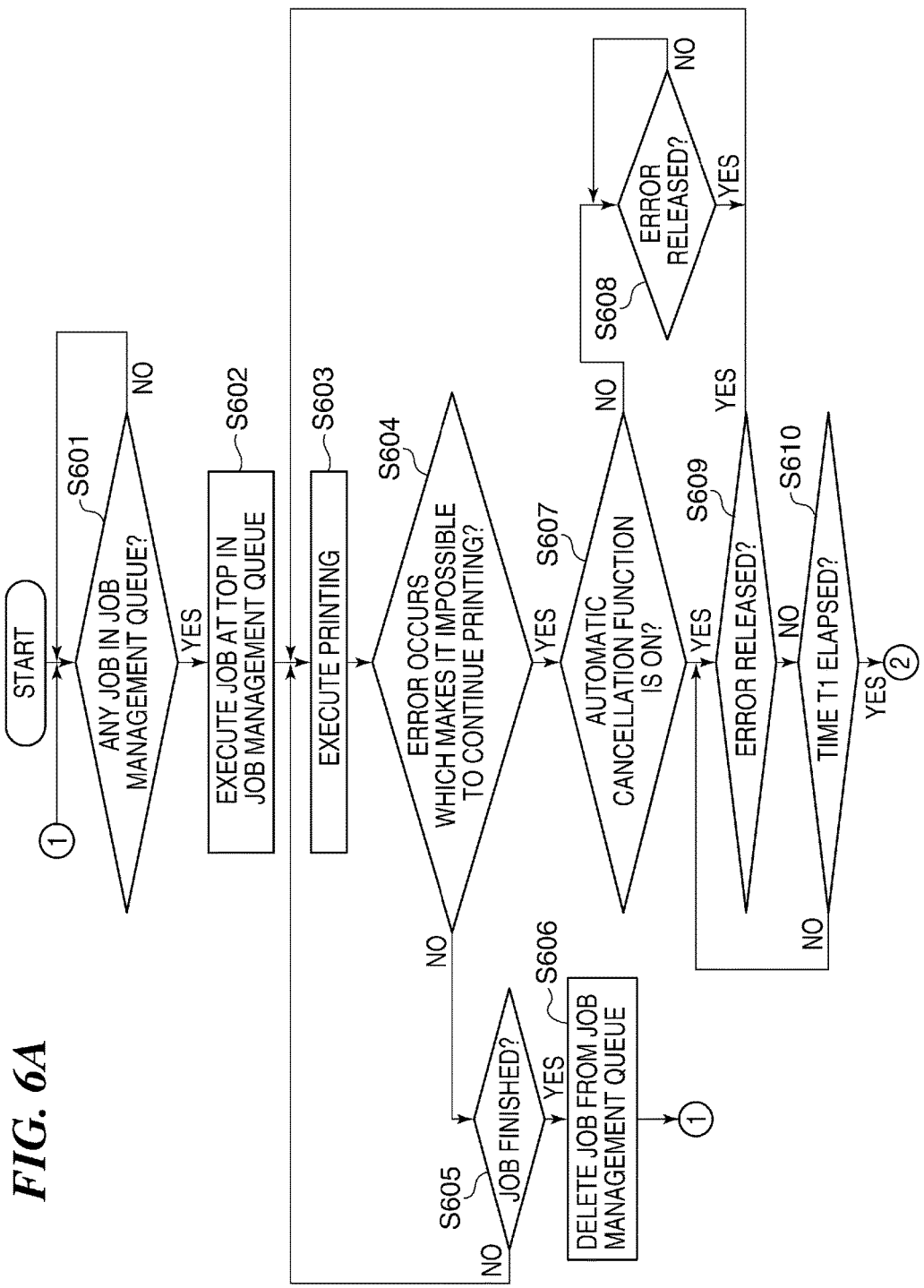
FIG. 6A is a flowchart of a print job-executing process.
Figure 6B:
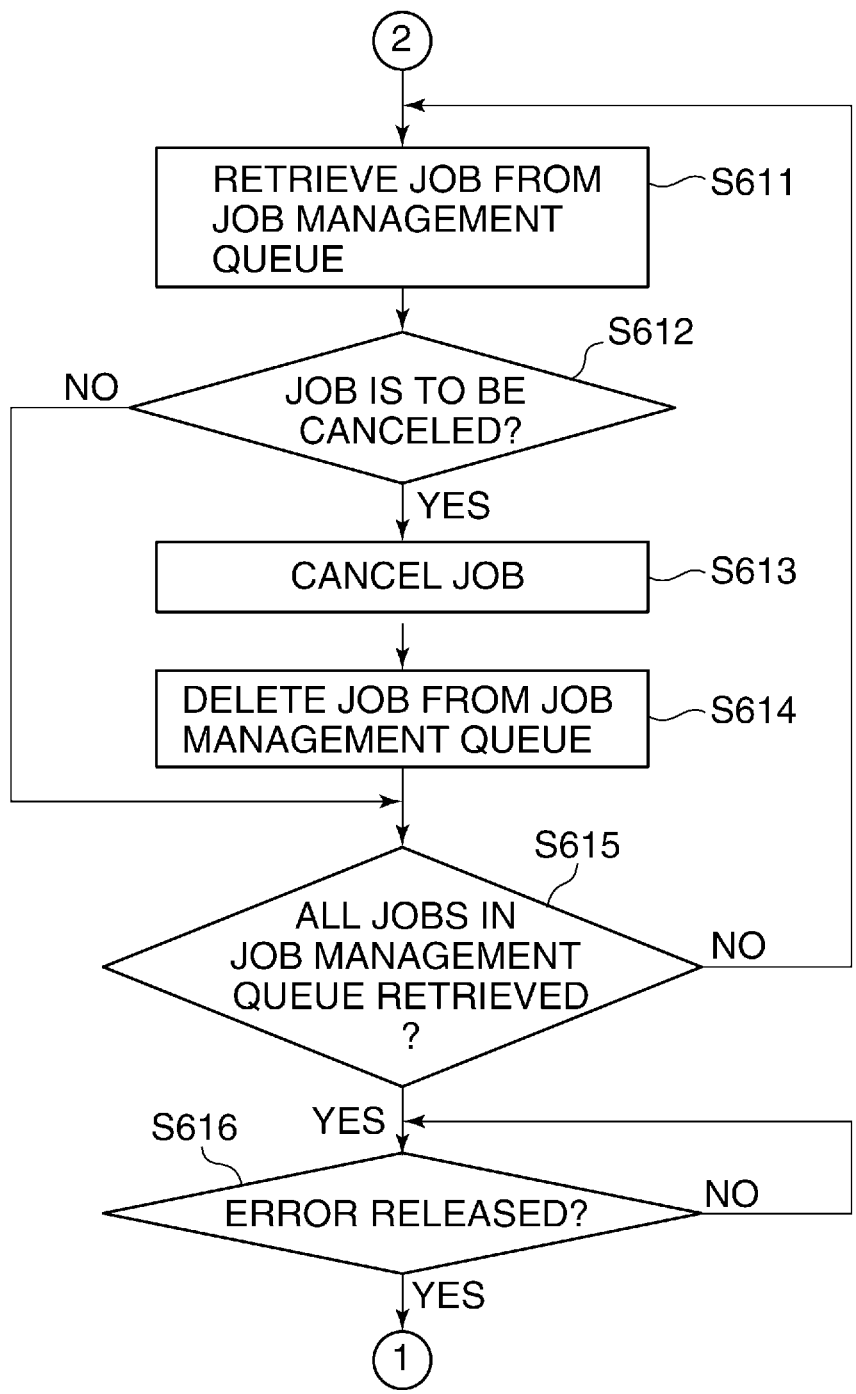
FIG. 6B is a continuation of FIG. 6B.

FIGS. 6A and 6B are a flowchart of a print job-executing process. The processing operations (steps) performed in the process in FIGS. 6A and 6B are realized by the CPU 107 of the printing apparatus 101 executing a control program stored in the ROM 108. This process is started when the printing apparatus 101 is powered on, and is performed in parallel with the print job-receiving process in FIG. 5.

First, in a step S601, the CPU 107 determines whether or not there is a print job in the job management queue 200, and if there is no print job in the job management queue 200, the CPU 107 repeats this determination until a print job is registered in the job management queue 200. If there is/are any print job(s) in the job management queue 200, in a step S602, the CPU 107 starts execution of a print job which is at the top in the job management queue 200 (the oldest in the order of reception). Next, in a step S603, the CPU 107 performs printing according to the print job which has been started in the step S602.

Next, in a step S604, the CPU 107 determines whether or not an event requiring interruption of execution of printing has occurred, i.e. there has occurred any error that restricts execution of the print job. If it is determined in the step S604 that an error has occurred, the CPU 107 proceeds to a step S607, whereas if no error has occurred, the CPU 107 proceeds to a step S605. In the step S605, the CPU 107 determines whether or not the print job being executed is finished (printing on all pages is completed). If it is determined in the step S605 that the print job being executed is not finished, the CPU 107 returns to the step S603. On the other hand, if the print job being executed is finished, the CPU 107 deletes the finished print job from the job management queue 200 (step S606), and returns to the step S601.

In the step S607, the CPU 107 determines whether or not the automatic cancellation function of the print job is set to ON. If it is determined in the step S607 that the automatic cancellation function is set to OFF, the CPU 107 determines whether or not the error having occurred has been eliminated (released) (step S608). For example, if the error having occurred is a paper out error, when sheets are replenished by the user, the error is eliminated. If the error having occurred is a toner out error, when toner is replenished by the user, the error is eliminated. If the error having occurred is a sheet jam error, when the jammed sheet is removed by the user, the error is eliminated. The CPU 107 repeats the determination in the step S608 until the error is eliminated, and when the error has been eliminated, the CPU 107 returns to the step S603, and performs printing.

If it is determined in the step S607 that the automatic cancellation function is set to ON, the CPU 107 determines whether or not the error having occurred has been eliminated (released) (step S609). If it is determined in the step S609 that the error having occurred has been eliminated, the CPU 107 returns to the step S603, and executes printing. On the other hand, if the error having occurred has not been eliminated, the CPU 107 proceeds to a step S610. In the step S610, the CPU 107 determines whether or not the predetermined time period T1 has elapsed after occurrence of the error, and if the predetermined time period T1 has not elapsed, the CPU 107 returns to the step S609, whereas if the predetermined time period T1 has elapsed, the CPU 107 retrieves a print job registered in the job management queue 200 (step S611). In this step, print jobs to be retrieved are the print job being executed at the time of occurrence of the error and print jobs following this job.

Next, in a step S612, the CPU 107 determines whether or not the print job retrieved this time is a job to be canceled. This is determined based on whether or not the print job retrieved this time has predetermined information added thereto which indicates that the print job is to be canceled, and if the print job retrieved this time has the predetermined information added thereto which indicates that the print job is to be canceled, it is determined that the print job is a job to be canceled. On the other hand, if the print job retrieved this time has predetermined information added thereto which indicates that the print job is not to be canceled, it is determined that the corresponding print job is not a job to be canceled. For example, in the illustrated example in FIG. 2, the first job 201 and the third job 203 are each determined to be a job to be canceled, but the second job 202 is determined to be not a job to be canceled.

If it is determined in the step S612 that the print job retrieved this time is a job to be canceled, the CPU 107 cancels the print job (step S613), and deletes the canceled print job from the job management queue 200 (step S614). After that, the CPU 107 proceeds to a step S615. On the other hand, if it is determined in the step S612 that the print job retrieved this time is not a job to be canceled, the CPU 107 proceeds to the step S615 without canceling the print job.

As described above, according to the automatic cancellation function, in the case where the importance is placed on security, and a print job being interrupted is canceled, as a general rule, the other print jobs registered in the job management queue 200 at the time are also canceled. However, a print job explicitly set by a user to a print job not to be canceled has a relatively not very high security risk from the viewpoint of leakage of classified information. Assuming that in spite of this, all of print jobs are automatically canceled based on occurrence of an error without exception, the canceled print jobs have to be transmitted again from client computer(s), which requires time and effort of users. To eliminate this inconvenience, in the present embodiment, out of the print jobs registered in the job management queue 200, print jobs each set to a print job to be canceled are canceled, but print jobs each set to a job not to be canceled are not canceled.

In the step S615, the CPU 107 determines whether or not all of the print jobs registered in the job management queue 200 have been retrieved. If there is any print job remaining to be retrieved, the CPU 107 returns to the step S611, wherein the next print job is retrieved. On the other hand, if all of the print jobs have been scanned, the CPU 107 proceeds to a step S616, wherein the CPU 107 determines whether or not the error having occurred has been eliminated, similarly to the steps 5608 and 5609. The CPU 107 repeats the determination in the step S616 until the error is eliminated, and when the error has been eliminated, the CPU 107 returns to the step S601.

As described above, the printing apparatus 101 includes a storage unit (the HDD 110 or the RAM 109, and the job management queue 200) that is capable of storing a plurality of print jobs. Further, if an error occurs during execution of a print job, the printing apparatus 101 identifies print jobs to be canceled out of the stored print jobs based on the predetermined information. Then, when the predetermined time period T1 elapses in a state in which the error is not eliminated, the printing apparatus 101 cancels the print jobs identified as the jobs to be canceled.

According to the present embodiment, in a case where an error occurs during execution of a print job, a print job to which is added the predetermined information indicating to cancel the print job is canceled, and hence information leakage is prevented. Further, even when an error occurs, a print job to which is added the predetermined information indicating not to cancel the print job is not canceled, and hence time and effort to input the corresponding job again is saved. Therefore, in the case where an error occurs during execution of a print job, it is possible to prevent information leakage without significantly lowering the user-friendliness.

Further, it is possible to set whether or not to execute automatic cancellation, and cancellation of a print job is executed on the condition that execution of automatic cancellation is permitted, and hence it is possible to improve the user-friendliness by enabling a mode in which cancellation is not executed.

Further, cancellation of print jobs is executed on the condition that the error is not eliminated even when the predetermined time period T1 elapses, and hence it is possible to suppress excessive execution of cancellation. Note that the predetermined time period T1 may be set on the print job-setting screen shown in FIG. 3.

Note that it may be assumed that a print job to which the predetermined information indicative of whether or not to be canceled is not added is registered in the job management queue 200. Such a print job to which the predetermined information itself is not added may be treated similar to a print job to which is added the predetermined information indicating not to cancel the print job, i.e. the print job may be not cancelled even when an error occurs.

In the step S612 in FIG. 6B, the determination of whether or not the print job retrieved this time is a print job to be canceled is performed based on whether or not the predetermined information indicating to cancel the print job is added. This predetermined information is added by the printer driver installed in the PC 113 which is the host computer. The determination of whether or not a print job is to be canceled may be performed based on a condition other than this, and the condition may be set by the printer driver.

For example, cancellation of a print job may be executed on the condition that a specific error occurs in the printing apparatus 101, such as a paper out error or a toner out error. In this case, for example, the predetermined information includes an error type to which cancellation of a print job is applied (application is enabled), and the error type can be set on the print job-setting screen shown in FIG. 3 by the printer driver. Then, when an error occurs during execution of a print job, the CPU 107 cancels a print job out of the stored print jobs, to which is added the predetermined information indicating to cancel the print job and including an error type which matches the error having occurred. That is, in the step S612 in FIG. 6B, the CPU 107 determines the type of the error having occurred. Then, if the predetermined information indicating to cancel the print job is added, and the error type included in the predetermined information matches the type of the error having occurred, the CPU 107 identifies the print job as a job to be canceled. After that, the identified print job is canceled in the step S613.

By doing this, it is possible to specify whether or not to execute cancellation of a print job depending on the error type, on a print job-by-print job basis, which improves the user-friendliness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008706 filed Jan. 20, 2016, which is hereby incorporated by reference herein in its entirety.

What is claimed is:

1. A printing apparatus comprising:
   a controller including a processor and a memory, the controller is configured to function as:
   a storage unit configured to store a plurality of print jobs;
   an execution unit configured to execute one print job of the stored print jobs; and
   a control unit configured to control, in accordance with an occurrence of an error in the execution of the one print job of the stored print jobs, whether or not to cancel a print job of the stored print jobs which is different from the one print job of the stored print jobs,
   wherein whether or not to cancel the different print job is controlled based on predetermined information relating to cancellation added to the different print job,
   wherein in a case where an error occurs while a print job is being executed by the execution unit and the printing apparatus is set to perform automatically canceling a print job, the control unit does not automatically cancel a print job, stored in the storage unit, to which is added predetermined information indicating not to cancel the print job, and wherein the control unit cancels a print job, stored in the storage unit, to which is not added predetermined information indicating not to cancel the print job.

2. The printing apparatus according to claim 1, wherein, in accordance with an occurrence of an error in the execution of the one print job of the stored print jobs, the control unit does not cancel the different print job based on the predetermined information indicating not to cancel the different print job added to the different print job.

3. The printing apparatus according to claim 1, wherein in accordance with an occurrence of an error in the execution of the one print job of the stored print jobs, the control unit cancels the different print job based on another predetermined information indicating to cancel the different print job added to the different print job.

4. The printing apparatus according to claim 1, further comprising a unit configured to set a predetermined time period.

5. The printing apparatus according to claim 1, further comprising an enabling unit configured to enable an automatic cancellation function, and
   wherein the control unit is able to cancel, in accordance with an occurrence of an error in the execution of the one print job of the stored print jobs, a print job on condition that the automatic cancellation function is enabled by the enabling unit but does not cancel the different print job based on the predetermined information indicating not to cancel the different print job added to the different print job.

6. The printing apparatus according to claim 1, further comprising a reception unit configured to receive a print job to which information indicative of whether or not the print job is to be canceled is added as the predetermined information, via a network, and
   wherein the storage unit stores the print job received by the reception unit.

7. The printing apparatus according to claim 1, wherein even in a case where an error occurs during execution of a print job, the control unit does not cancel a print job out of the print jobs stored in the storage unit to which is not added predetermined information including an error type which matches the error having occurred.

8. A method of controlling a printing apparatus including a storage unit, comprising:
   storing a plurality of print jobs in the storage unit;
   executing one print job of the stored print jobs; and
   controlling, in accordance with an occurrence of an error in the execution of the one print job of the stored print jobs, whether or not to cancel a print job of the stored print jobs which is different from the one print job of the stored print jobs,
   wherein whether or not to cancel the different print job is controlled based on predetermined information relating to cancellation added to the different print job,
   wherein in a case where an error occurs while a print job is being executed and the printing apparatus is set to perform automatically canceling a print job, a print job, stored in the storage unit, to which is added predetermined information indicating not to cancel the print job, is not automatically cancelled, and wherein a print job, stored in the storage unit, to which is not added predetermined information indicating not to cancel the print job, is cancelled.

9. A non-transitory computer-readable storage medium storing a computer-executable program for executing a method of controlling a printing apparatus including a storage unit,
   wherein the method comprises:
   storing a plurality of print jobs in the storage unit;
   executing one print job of the stored print jobs; and
   controlling, in accordance with an occurrence of an error in the execution of the one print job of the stored print jobs, whether or not to cancel a print job of the stored print jobs which is different from the one print job of the stored print jobs,
   wherein whether or not to cancel the different print job is controlled based on predetermined information relating to cancellation added to the different print job,
   wherein in a case where an error occurs while a print job is being executed and the printing apparatus is set to perform automatically canceling a print job, a print job, stored in the storage unit, to which is added predetermined information indicating not to cancel the print job, is not automatically cancelled, and wherein a print job, stored in the storage unit, to which is not added predetermined information indicating not to cancel the print job, is cancelled.

10. The printing apparatus according to claim 1, wherein the predetermined information is added to the print job in accordance with an input via user interface of a printer driver in a computer which communicates with the printing apparatus.

* * * * *